United States Patent [19]

Hagiwara

[11] Patent Number: 5,132,850
[45] Date of Patent: Jul. 21, 1992

[54] LENS ACTUATOR

[75] Inventor: Hiroyuki Hagiwara, Tokyo, Japan

[73] Assignee: Canon Kabushiki Kaisha, Tokyo, Japan

[21] Appl. No.: 592,303

[22] Filed: Oct. 2, 1990

[30] Foreign Application Priority Data

Oct. 5, 1989 [JP] Japan .................................. 1-258880

[51] Int. Cl.$^5$ .............................................. G02B 7/02
[52] U.S. Cl. .................... 359/813; 359/823; 369/44.22
[58] Field of Search ............... 350/247, 252, 255; 369/44.11, 44.14, 44.17, 44.22

[56] References Cited

U.S. PATENT DOCUMENTS

4,571,026  2/1986  Maruta .............................. 359/813

Primary Examiner—Loha Ben
Attorney, Agent, or Firm—Fitzpatrick, Cella, Harper & Scinto

[57] ABSTRACT

A lens actuator has a support shaft, a substantially cylindrical holder member slidably supported by the support shaft and an optical system. The holder member has at least four openings extending in the direction of the center axis of the support shaft. The optical system is held by the holder member so that the optical axis thereof is parallel with the center axis of the support shaft. A coil is mounted on the side of the holder member. An external yoke is provided around the holder member. An internal yoke is divided into the same number of portions to be inserted in the openings as the openings in the holder member. A magnetic field across the coil is generated by a magnet cooperating with the external yoke and the internal yoke. The rigidity of the holder member is enhanced so that the occurrence of resonance can be suppressed at the frequency used in the actuator.

11 Claims, 6 Drawing Sheets

LENS ACTUATOR

BACKGROUND OF THE INVENTION

1. Field of the Invention

This invention relates to a lens actuator for use in the recording/reproducing pickups of various apparatuses such as an optical video disk player, a compact digital audio disk player and an optical data memory.

2. Related Background Art

Figure 1:
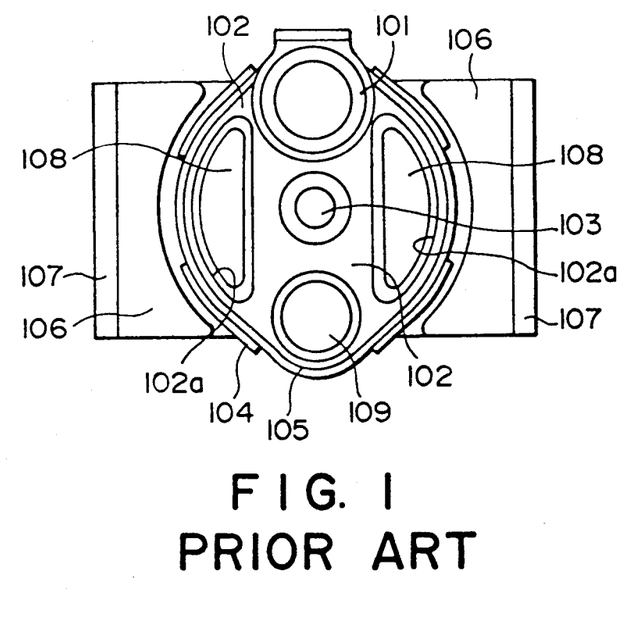
FIGS. 1 and 2 are a plan view and an exploded perspective view, respectively, showing an example of the lens actuator according to the prior art.

Known as the above-described lens actuator is one as described, for example, in U.S. Pat. No. 4,571,026. FIG. 1 of the accompanying drawings is a plan view showing an example of such prior-art lens actuator, and FIG. 2 of the accompanying drawings is an exploded perspective view of the same.

Figure 2:
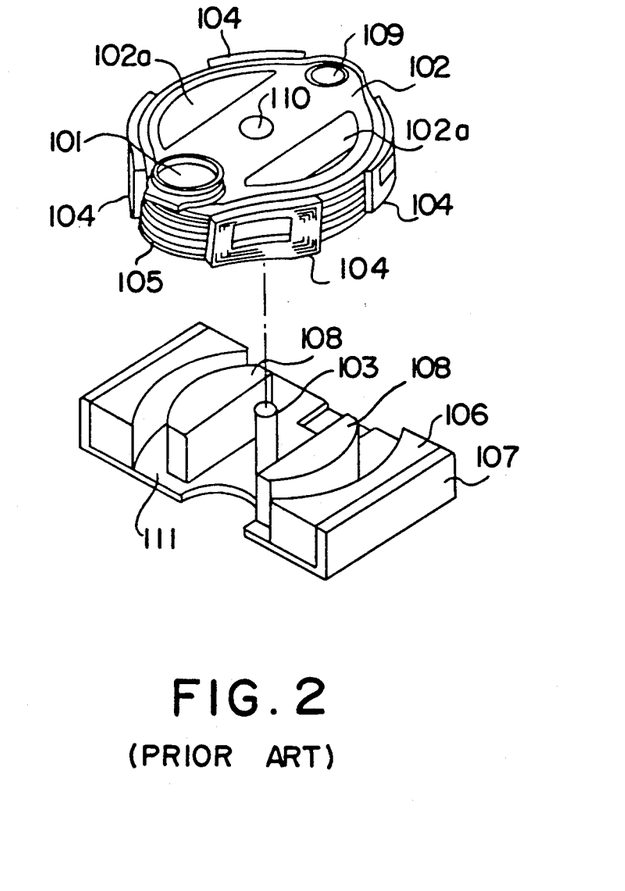

Referring to FIGS. 1 and 2, an objective lens 101 is held by a lens holder 102. The lens holder 102 is provided with bearings not shown and is supported by a support shaft 103 for rotation about this support shaft and for sliding in the direction of the center axis of this shaft. A balancer 109 for keeping weight balance with the objective lens 101 is mounted at a position on the lens holder 102 which is symmetrical with the objective lens 101 with respect to the shaft.

A focusing coil 105 and a tracking coil 104 are mounted on the cylindrical side of the lens holder 102. A magnetic field is applied to these coils by a magnetic circuit comprised of a magnet 106, an external yoke 107, an internal yoke 108 and a bottom yoke 111. The lens holder 102 has two openings 102a in which the internal yoke 108 is inserted.

In the lens actuator constructed as described above, when an electric current is supplied to the focusing coil 105, a vertical drive force is generated and the lens holder 102 slides relative to the shaft 103. Along therewith, the objective lens 101 moves in the direction of the optic axis thereof, and the focus position of a light beam condensed on the optical disk through this lens varies relative to the surface of the disk. If the electric current supplied to the focusing coil 105 is made to correspond to a focusing error signal, focusing servo will be effected by the movement of said lens.

On the other hand, when an electric current is supplied to the tracking coil 104, a force in the direction of rotation about the shaft 103 is generated and rotatively drives the lens holder 102. Along therewith, the objective lens 101 moves in a direction orthogonal to the optic axis, and the light beam travels across tracks formed on the disk. Accordingly, by the electric current supplied to the tracking coil 104 being made to correspond to a tracking error signal, tracking servo is effected.

However, a problem as will hereinafter be described has arisen in the lens actuator as shown in FIG. 1. For example, when an optical disk whose surface is warped and which has caused eccentricity is rotated at a high speed, the actuator is driven at a high frequency to effect focusing servo and tracking servo. As a result, resonance occurs in the actuator, and this has led to a case where servo is not applied.

Figure 3:
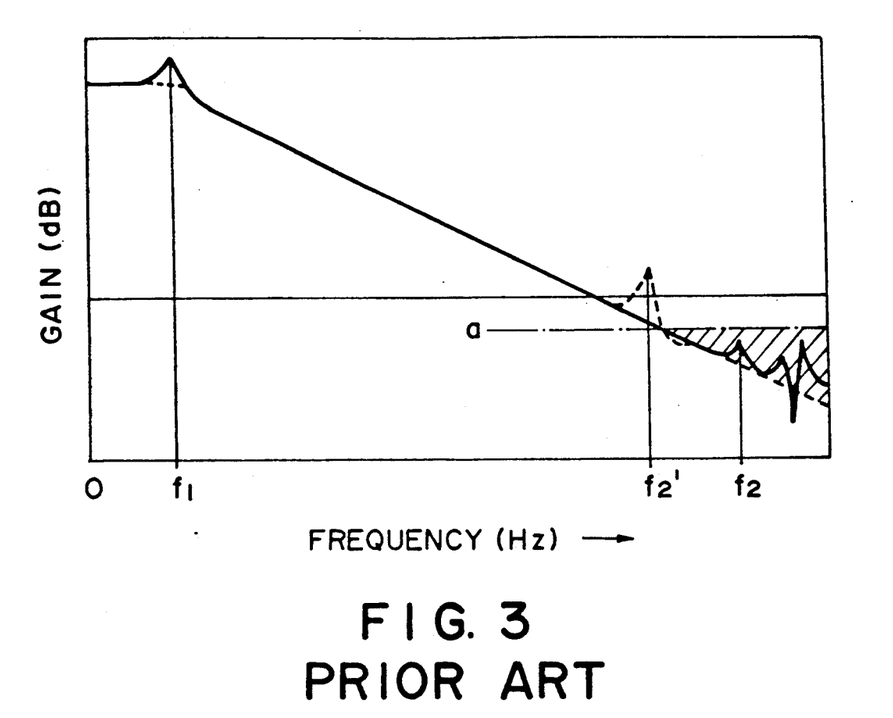
FIG. 3 is a graph showing the gain frequency response characteristic in the prior-art lens actuator.

For example, the gain frequency response characteristic in the focusing direction of the lens actuator shown in FIG. 1 is such as shown in FIG. 3 of the accompanying drawings. In this figure, $f_1$ is the resonant frequency of a support system for the movable portion, and is usually about 100 Hz. Also $f_2$, is the resonant frequency by the deformation of the movable portion, i.e., the lens holder. If a range partitioned by line a is prescribed as the necessary condition of the servo system, the peak $f_2$, is over the line a, and if servo is applied in this state, the actuator will oscillate and become unusable. This line a is determined by the amount of surface warp, the amount of eccentricity and the number of revolutions of the disk.

Figure 4:
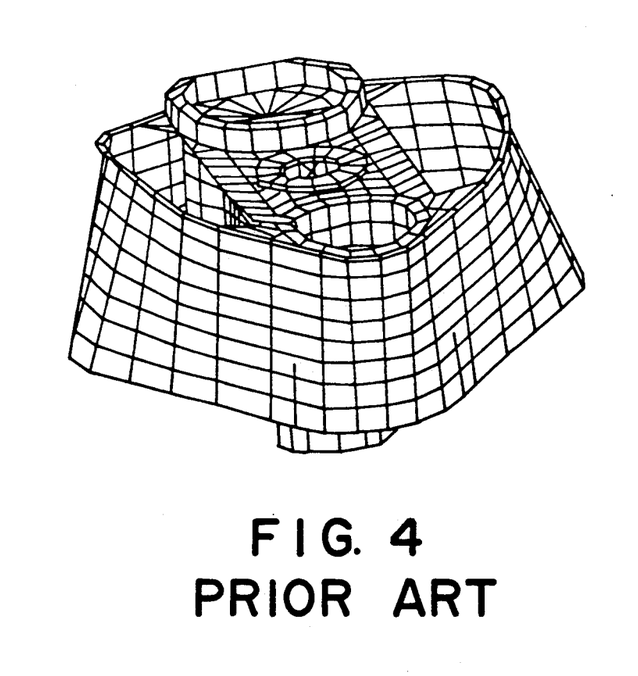
FIG. 4 shows the deformation of the prior-art lens actuator when driven.

FIG. 4 of the accompanying drawings is a view in which the deformation of a bobbin at $f_2$, has been simulated. As is apparent from this, the surrounding annular portion is deformed in such a manner as to open outwardly, and correspondingly thereto, the portion holding the objective lens is also deformed. This can be structurally inferred as a result of the fact that the opening 102a in which the internal yoke is inserted is large and therefore the rigidity of the lens holder 102 is reduced.

SUMMARY OF THE INVENTION

It is the object of the present invention to solve the above-notes problem peculiar to the prior art and to provide a lens actuator which drives smoothly.

The above object of the present invention is achieved by a lens actuator comprising:

a support shaft;

a substantially cylindrical holder member slidably supported by the support shaft, the holder member having at least four openings extending in the direction of the center axis of the support shaft;

an optical system held by the holder member so that the optic axis thereof may be parallel to the center axis of the support shaft;

a coil mounted on the side of the holder member;

an external yoke provided around the holder member;

an internal yoke divided into the same number of portions as the openings in the holder member, the portions being inserted in the openings, respectively; and a magnet cooperating with the external yoke and the internal yoke to form a magnetic field across the coil.

That is, in the present invention, the opening for inserting the internal yoke thereinto is provided with partitions to thereby subdivide the opening, thus enhancing the rigidity of the holder member. Thereby, the frequency at which resonance phenomenon occurs becomes high, and the occurrence of resonance can be suppressed at the frequency used in the actuator. For example, according to the present invention, resonance does not occur at $f_2$, in FIG. 3, and the resonant frequency becomes higher than $f_2$. Accordingly, the actuator can be driven without being affected by resonance in the normal servo band.

DESCRIPTION OF THE PREFERRED EMBODIMENTS

Figure 5:
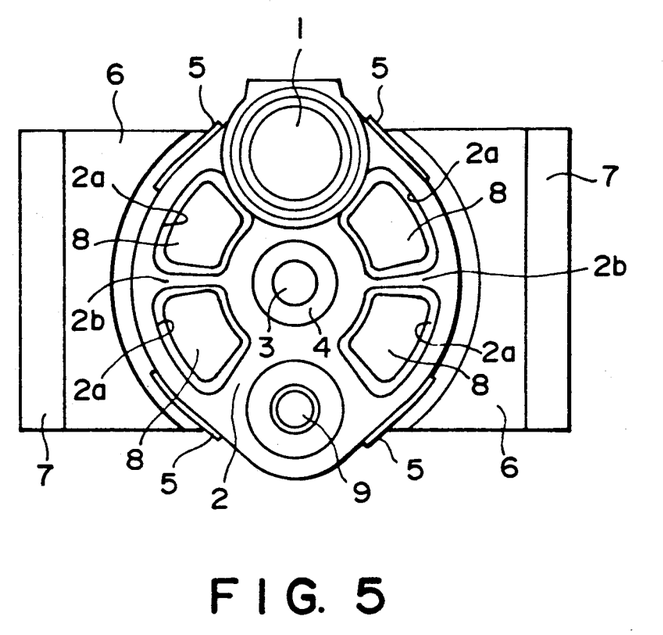
FIGS. 5 and 6 are a plan view and an exploded perspective view, respectively, showing an embodiment of the lens actuator of the present invention.
Figure 6:
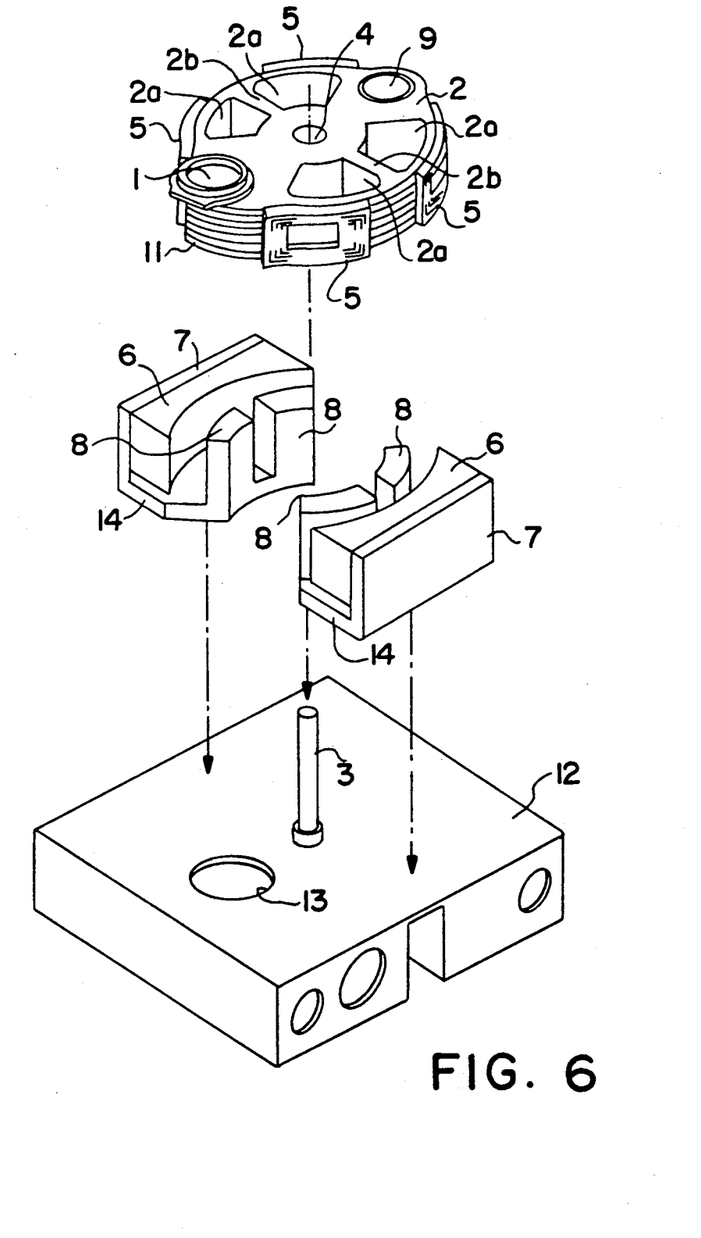

FIGS. 5 and 6 are a plan view and an exploded perspective view, respectively, showing an embodiment of the lens actuator of the present invention. In these figures, the reference numeral 3 designates a support shaft. The support shaft 3 is secured to a pickup body 12. A lens holder 2 is substantially cylindrical and is engaged with the support shaft 3 with a bearing 4 interposed therebetween. The lens holder 2 is supported by the support shaft 3 for sliding in the direction of the center axis of the shaft 3 and for rotation about the shaft 3.

An objective lens 1 is held on the lens holder 2 at a location spaced apart from the center axis of the shaft 3. The optic axis of this objective lens 1 is parallel to the center axis of the shaft 3. The objective lens 1 condenses a light beam emerging from an opening 13 in the pickup body 12 and applies it onto a recording medium such as an optical disk, not shown. A balance weight 9 is provided at a location on the lens holder 2 which is symmetric with the objective lens with respect to the shaft 3. This balance weight 9 is for regulating the position of the center of gravity of the entire lens holder including the objective lens 1, and operating the actuator smoothly.

The lens holder 2 may preferably be made of a non-magnetic material, for example, resin such as PPS or liquid crystal polymer, or a light metal such as aluminum. Also, the bearing 4 may preferably be formed of aluminum or the like having the inner surface thereof finished as a mirror surface. The outer surface of the support shaft 3 is provided with a coating for mitigating the frictional force thereof.

A focusing coil 11 is wound in the form of a drum on the outer side of the lens holder 2. Four tracking coils 5 are adhesively secured to the focusing coil 11. Each tracking coil comprises a planar coil wound in a rectangular shape in advance. One of the two sides of these tracking coils 5 in which an electric current flows in the direction of the center axis of the shaft 3 is disposed in the space between an internal yoke 8 and magnets 6. In this space, the tracking coils 5 and the focusing coil 11 overlap with one another and the directions in which the electric current flows are orthogonal to each other.

Means for generating a magnetic field across the coils is comprised of the magnets 6, external yokes 7 and the internal yoke 8. The two magnets 6 are disposed so as to face each other with the lens holder interposed therebetween, and are secured to the external yokes 7, respectively. The magnets 6 are magnetized so as to produce magnetic fields going toward the center axis of the shaft 3 in the radial direction or diverging from the center axis. Also, the magnets 6 have a high magnetic flux density. The internal yoke 8 is divided into four portions each having an arcuate cross-sectional shape. The internal yoke 8, with the external yokes 7, is formed integrally with a bottom yoke 14. These yokes and the magnets 6 together constitute a closed magnetic circuit.

The lens holder 2 is formed with four openings 2a extending in the direction of the center axis of the support shaft 3. The divided portions of the internal yoke 8 are inserted in these openings 2a, respectively. The support shaft 3 is secured to the pickup body 12, and the yokes 7, 8 and 14 and the magnets 6 are also fixed to the pickup body 12. The shaft 3 is inserted in the bearing 4, and the lens holder 2 is movably supported by the shaft 3.

In the above-described construction, when an electric current corresponding to a focusing error signal is supplied to the focusing coil 11, the lens holder 2 slides in the direction of the center axis of the shaft 3 and focusing servo is effected. Also, when an electric current corresponding to a tracking error signal is supplied to the tracking coils 5, the lens holder 2 rotates about the shaft 3 and tracking servo is effected.

Figure 7A:
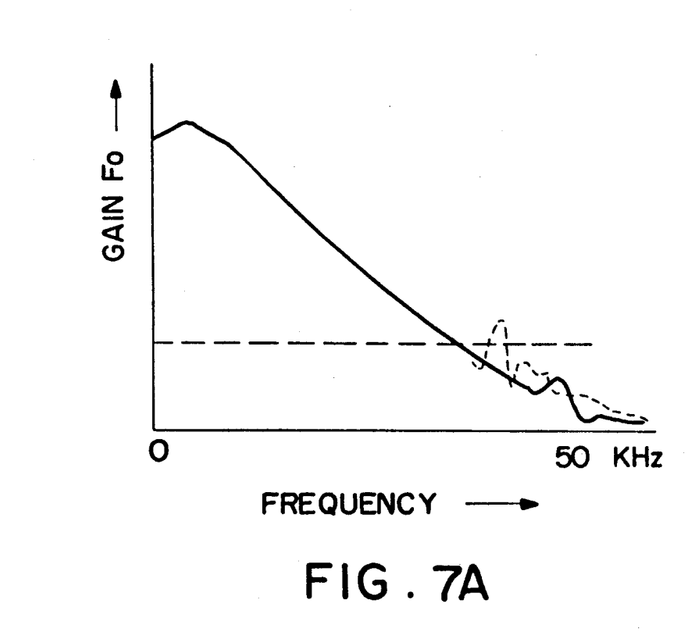
FIGS. 7A and 7B are graphs showing the gain frequency response characteristic in the lens actuator of the present invention.
Figure 7B:
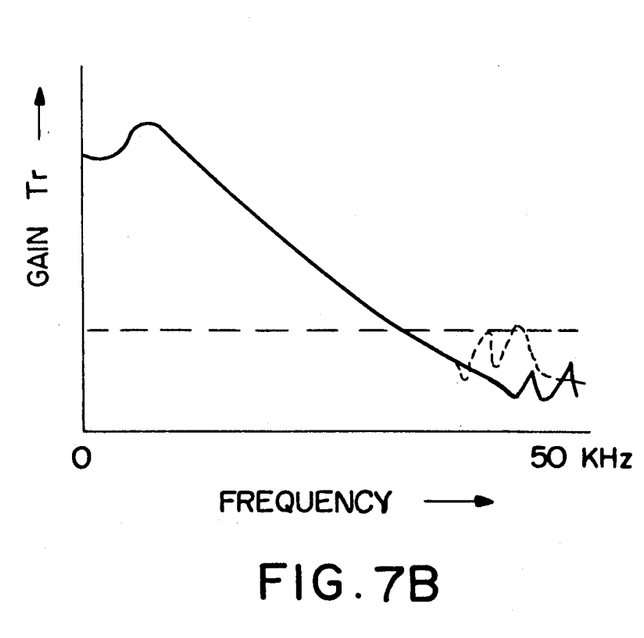

FIGS. 7A and 7B are graphs showing the gain frequency response characteristic of the lens actuator of the present invention from 0 to 5 kHz. FIG. 7A shows the focusing direction, and FIG. 7B shows the tracking direction. The solid lines indicate the characteristics of the actuator of the present invention. The broken lines indicate the characteristics of the prior-art actuator of FIG. 1 which are shown for comparison. As can be seen from these graphs, in the actuator of the present invention, as compared with the prior-art actuator, the resonant frequency is in a high frequency range and the gain of the peak value is small. This is because in the present invention, the bearing portion and outer peripheral portion of the lens holder 2 are connected together by radially extending beam portions 2b and the rigidity of the lens holder 2 is enhanced. Thus, if the actuator of the present invention is used, resonance will not occur in the usually used frequency range and the actuator can be driven accurately.

Figure 8:
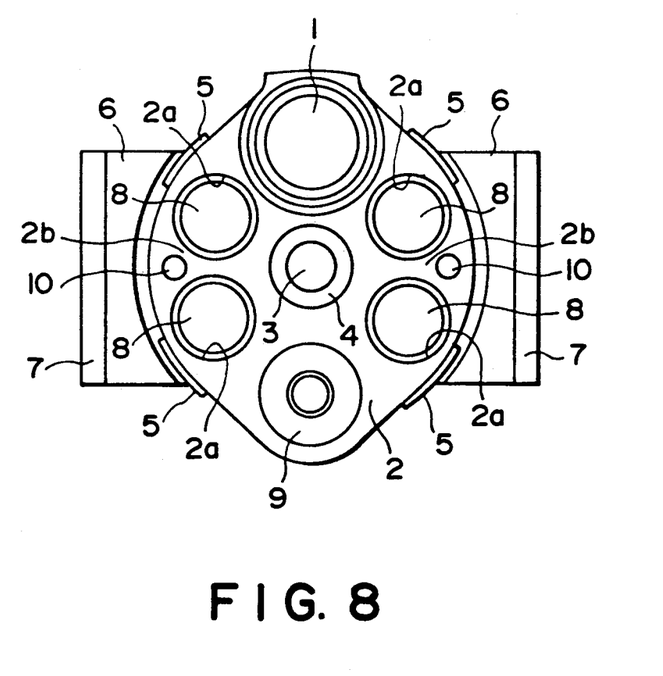
FIG. 8 is a plan view showing another embodiment of the lens actuator of the present invention.

FIG. 8 is a plan view showing another embodiment of the lens actuator of the present invention. In FIG. 8, members identical to those in FIG. 5 are given identical reference characters and need not be described in detail.

The present embodiment differs from the embodiment of FIG. 5 in that the cross-sectional shapes of the openings 2a in the lens holder and the internal yoke 8 are circular. In this embodiment, the internal yoke 8 can be constructed of a pin of high magnetic permeability, and can also be fixed by being forced into holes formed in the bottom yoke. Again by the present embodiment, an operational effect similar to that of the embodiment of FIG. 5 can be obtained. In FIG. 8, the reference numeral 10 designates openings for making the lens holder 2 lighter in weight.

The present invention permits various applications, besides the above-described embodiments. For example, the number of the openings in the lens holder may be more than four. In such case, the internal yoke is correspondingly further subdivided. The present invention covers all such applications without departing from the scope of the invention as defined in the appended claims.

I claim:
1. A lens actuator comprising:
   a support shaft;
   a substantially cylindrical holder member slidably supported by said support shaft, said holder member having at least four openings extending in the direction of the center axis of said support shaft;
   an optical system held by said holder member so that the optical axis thereof may be parallel to the center axis of said support shaft;
   a coil mounted on the side of said holder member;
   an external yoke provided around said holder member;

an internal yoke divided into the same number of portions as the openings in said holder member, said portions being inserted in said openings, respectively; and a magnet cooperating with said external yoke and said internal yoke to form a magnetic field across said coil.

2. A lens actuator according to claim 1, wherein said optical system is held by said holder member at a location spaced apart from the center axis of said support shaft, and said holder member is provided for rotation about said support shaft.

3. A lens actuator according to claim 2, wherein said coil comprises a focusing coil wound in the form of a drum on the side of said holder member, and a planar tracking coil secured onto said focusing coil.

4. A lens actuator according to claim 1, wherein said openings in said holder member and said portions of said internal yoke have an arcuate cross-sectional shape.

5. A lens actuator according to claim 1, wherein said openings in said holder member and said portions of said internal yoke have a circular cross-sectional shape.

6. A lens actuator according to claim 1, further comprising a bearing provided in said holder member and engaged with said support shaft.

7. A lens actuator according to claim 6, wherein said bearing is formed of aluminum having its inner surface finished as a mirror surface.

8. A lens actuator according to claim 1, further comprising a bottom yoke for connecting said internal yoke and said external yoke together.

9. A lens actuator according to claim 1, wherein said support shaft is provided on the outer surface thereof with a coating for mitigating the friction thereof.

10. A lens actuator according to claim 1, wherein said holder member is formed of one of resin and a light alloy.

11. A lens actuator according to claim 1, further comprising a base body to which are secured said support shaft, said external yoke, said internal yoke and said magnet.

* * * * *

UNITED STATES PATENT AND TRADEMARK OFFICE
CERTIFICATE OF CORRECTION

PATENT NO. : 5,132,850
DATED : July 21, 1992
INVENTOR(S) : Hagiwara

It is certified that error appears in the above-identified patent and that said Letters Patent is hereby corrected as shown below:

Column 7,

Line 9, "$f_2$," should read --$f_2'$--;

Line 22, "above-notes" should read --above-noted--;

Signed and Sealed this

Fifth Day of October, 1993

Attest:

BRUCE LEHMAN

*Attesting Officer*    Commissioner of Patents and Trademarks